US008680775B2

(12) United States Patent  (10) Patent No.: US 8,680,775 B2
Matsuda et al.  (45) Date of Patent: Mar. 25, 2014

(54) LIGHTING DRIVER CIRCUIT AND LIGHT FIXTURE

(75) Inventors: Kenji Matsuda, Osaka (JP); Ryosuke Nakamura, Hyogo (JP)

(73) Assignee: Panasonic Corporation, Osaka (JP)

( * ) Notice: Subject to any disclaimer, the term of this patent is extended or adjusted under 35 U.S.C. 154(b) by 131 days.

(21) Appl. No.: 13/451,669

(22) Filed: Apr. 20, 2012

(65) Prior Publication Data

US 2012/0293087 A1    Nov. 22, 2012

(30) Foreign Application Priority Data

Apr. 21, 2011  (JP) ................................. 2011-095034

(51) Int. Cl.
*H05B 37/02*  (2006.01)
(52) U.S. Cl.
USPC .......................................... 315/219; 315/291
(58) Field of Classification Search
None
See application file for complete search history.

(56) References Cited

U.S. PATENT DOCUMENTS

| | | | |
|---|---|---|---|
| 2010/0109548 A1* | 5/2010 | Matsuda ....................... | 315/279 |
| 2011/0080111 A1* | 4/2011 | Nuhfer et al. ................. | 315/291 |
| 2012/0212148 A1* | 8/2012 | Watanabe et al. ............. | 315/224 |
| 2013/0076257 A1* | 3/2013 | Hsieh ............................ | 315/201 |
| 2013/0093356 A1* | 4/2013 | Green et al. .................. | 315/297 |

FOREIGN PATENT DOCUMENTS

| JP | 20110123681 | 4/2009 |
|---|---|---|
| JP | 2011070966 | 7/2011 |

* cited by examiner

*Primary Examiner* — Jany Richardson
(74) *Attorney, Agent, or Firm* — Waddey Patterson; Mark J. Patterson; Mark A. Pitchford

(57) ABSTRACT

A lighting fixture that suppresses blinking and flickering phenomena even when operating at very low luminance levels includes: a light source including at least one solid state light-emitting element; and a lighting driver circuit controlling the light source in accordance with a control signal. The lighting driver circuit includes an isolating flyback circuit and a control circuit. The isolating flyback circuit switches power from a DC power source and smooths the output. The control circuit controls switching operation performed by a switching element of the isolating flyback circuit via PWM signal. The control circuit provides a frequency component in accordance with the control signal to a reference signal outputted by a reference signal generator. In accordance with results of detection of the reference signal and a current flowing through the light source, the control circuit provides a stop period during which a driver controller driving the switching element is stopped.

20 Claims, 4 Drawing Sheets

LIGHTING DRIVER CIRCUIT AND LIGHT FIXTURE

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application which is hereby incorporated by reference: Japan Patent Application No. 2011-095034, filed Apr. 21, 2011.

STATEMENT REGARDING FEDERALLY SPONSORED RESEARCH OR DEVELOPMENT

Not Applicable

REFERENCE TO SEQUENCE LISTING OR COMPUTER PROGRAM LISTING APPENDIX

Not Applicable

BACKGROUND OF THE INVENTION

The present invention relates to a lighting driver circuit that lights a solid state light-emitting element such as a light emitting diode (LED), and a light fixtures that include LED driver circuits.

Conventionally, a lighting driver circuit powering a light source (e.g., an LED) has a power switch supplying a constant current to the solid state light-emitting element. The driver circuit controls ON/OFF operation of the power switch to provide a constant current to and light the solid state light-emitting element at a set dimming level.

For example, in the lighting circuit disclosed in Japanese Patent Application JPA 2011-70966, the lighting circuit controls the ON/OFF switching operation of a switching element in the lighting circuit via a PWM signal whose ON-time ratio corresponds to a dimming control value associated with a dimming level of the light source. Moreover, in this lighting circuit, the switching operation is started and stopped in a first cycle of a half cycle of an AC power source and the ON-time ratio is adjusted in accordance with the dimming control value. That is, in this lighting circuit, a light-emitting diode serving as the light source is illuminated a set dimming level through burst control performed on the ON/OFF operation of the switching element.

Output from a conventional lighting circuit as described above increases in the ON time during which the switching operation is performed and decreases in the OFF time during which the switching operation is stopped, thus causing a ripple waveform in the output voltage and luminance output. The response time of the solid state light-emitting element in particular is faster than that of other light sources (for example, fluorescent light). Therefore a low dimming level or an increase in the cycle (first cycle) of the burst control may cause a visually perceptible variation in the luminance output.

BRIEF SUMMARY OF THE INVENTION

In view of the problem described above, it is an object of the present invention to provide a lighting driver circuit and an light fixture capable of suppressing blinking and flickering phenomenon. To achieve this objective, a lighting driver circuit according to the present invention includes a switching circuit receiving input power from a DC power source, switching the received input power via a switching element, smoothing the switched input power, and outputting smoothed, switched input power to a light source (i.e., a solid state light-emitting element). The lighting driver circuit also includes a control circuit controlling a switching operation of the switching element to adjust the output to the light source based on a control signal whose ON-time ratio corresponds to a dimming level. The control circuit has a driver controller circuit performing PWM control on the switching element and a burst control circuit receiving a feedback signal indicative of the output to the light source. The burst control circuit (i.e., a reference signal generator and an operational amplifier) provides a reference signal at a predetermined frequency as a function of a magnitude of the feedback signal and a difference between the reference signal and a threshold value. The control circuit provides a quiescent period in the PWM control performed by the driver controller.

In the lighting driver circuit, the burst control circuit preferably outputs the reference signal with a reference potential corresponding to a frequency of the control signal S1. A lower limit value of the frequency of the control signal is preferably 300 Hz, and an upper limit value of the frequency of the control signal is preferably 1000 Hz.

A light fixture according to the present invention includes a light source and the lighting driver circuit described above.

A lighting driver circuit and a light fixture according to aspects of the present invention can suppress blinking and flickering phenomena even when the light source is operated at a low luminance output.

DETAILED DESCRIPTION OF THE INVENTION

Figure 1:
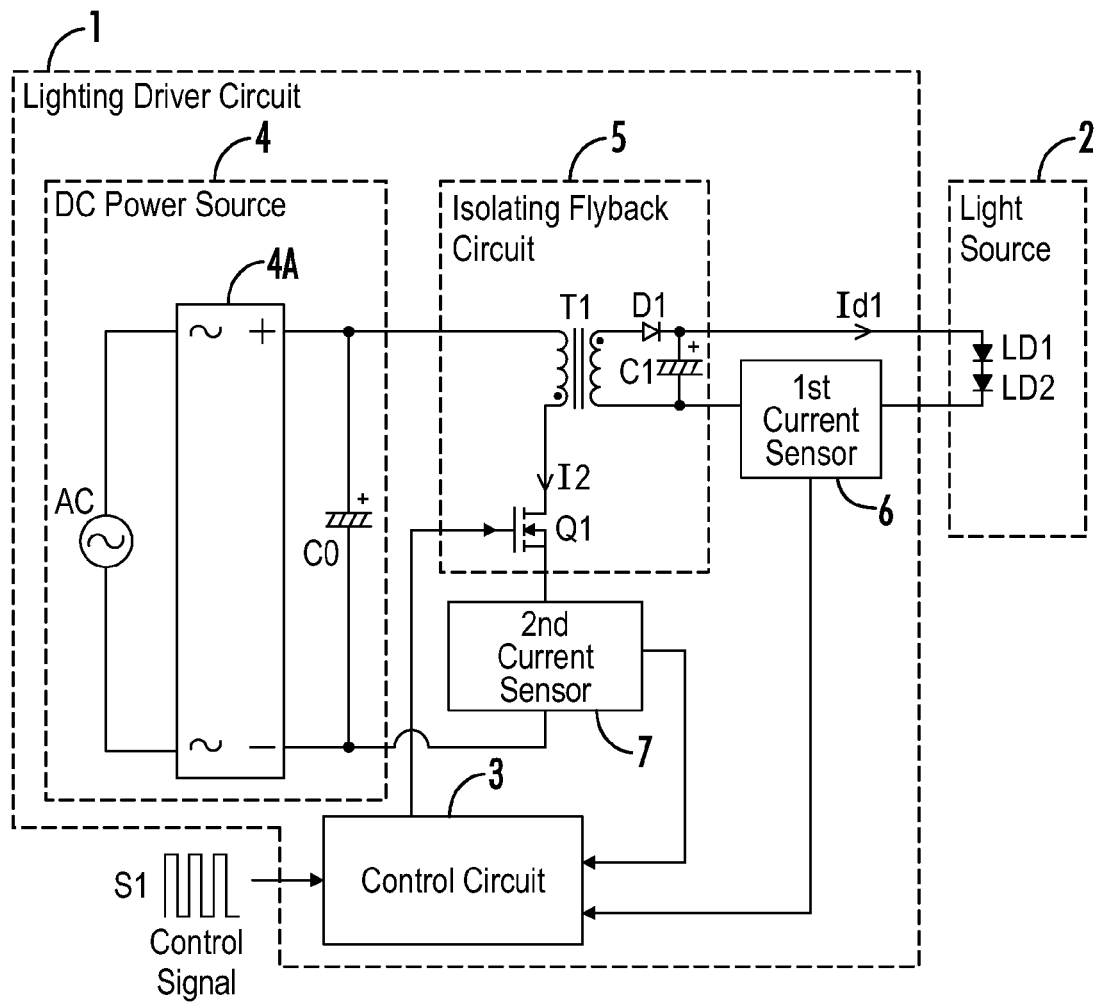
FIG. 1 is a block and partial schematic circuit diagram of a light fixture including a lighting driver circuit and light source according to an embodiment of the present invention.

Referring to FIG. 1, a light fixture includes a light source 2 and a lighting driver circuit 1. The lighting driver circuit 1 controls a lighting state of the light source 2. The light source 2 includes one or a plurality of solid state light-emitting elements LD1, such as a light emitting diode (LED). In the present embodiment, two solid state light-emitting elements LD1 and LD2 are connected in series. The number of solid state light-emitting elements LD1 and method of connecting them together are not limited to those of the present embodiment, and they can be altered as appropriate to the embodiment. Moreover, the solid state light-emitting element LD1 is not limited to a light-emitting diode and may be another type of light-emitting element such as an organic EL.

The lighting driver circuit 1 includes: a DC power source 4, an isolating flyback circuit 5, and a control circuit 3. The isolating flyback circuit 5 switches the output from the DC power source 4 to light the light source 2. The control circuit 3 controls switching operation of a switching element Q1 of the isolating flyback circuit 5. The lighting driver circuit 1 also includes first and second current sensors 6 and 7. The first current sensor 6 detects a current Id1 flowing through the light source 2 and the second current sensor 7 detects a drain current I2 of the switching element Q1 of the isolating flyback circuit 5.

The DC power source 4 is a DC constant-current power source and includes a rectifying circuit 4a and a capacitor C0. The rectifying circuit 4a performs full-wave rectification on AC power from, for example, a commercial power source AC to convert the AC power to DC power. The capacitor C0 is connected between output terminals of the rectifying circuit 4a. The DC power source 4 may be configured to include a DC/DC converter that outputs DC power or may be configured to have only the DC constant-current power source.

The isolating flyback circuit 5 includes an isolating transformer T1, the switching element Q1, a capacitor C1, and a diode D1. The isolating transformer T1 is hereinafter referred to as the transformer T1. The switching element Q1 is connected to a primary winding of the transformer T1. The diode D1 is connected to a secondary winding of the transformer T1. The capacitor C1 is connected between the terminals of the secondary winding of the transformer T1, in parallel with the light source 2.

The dimming control circuit 3 receives a control signal S1. The control signal S1 is a pulse width modulation (PWM) signal having an ON-duty (i.e., duty cycle) that changes in accordance with a dimming level set by a user. The user sets the dimming level via an input device (not shown) of the light fixture. The dimming control circuit 3 controls ON/OFF cycling of the switching element Q1 as a function of the control signal S1.

Figure 2:
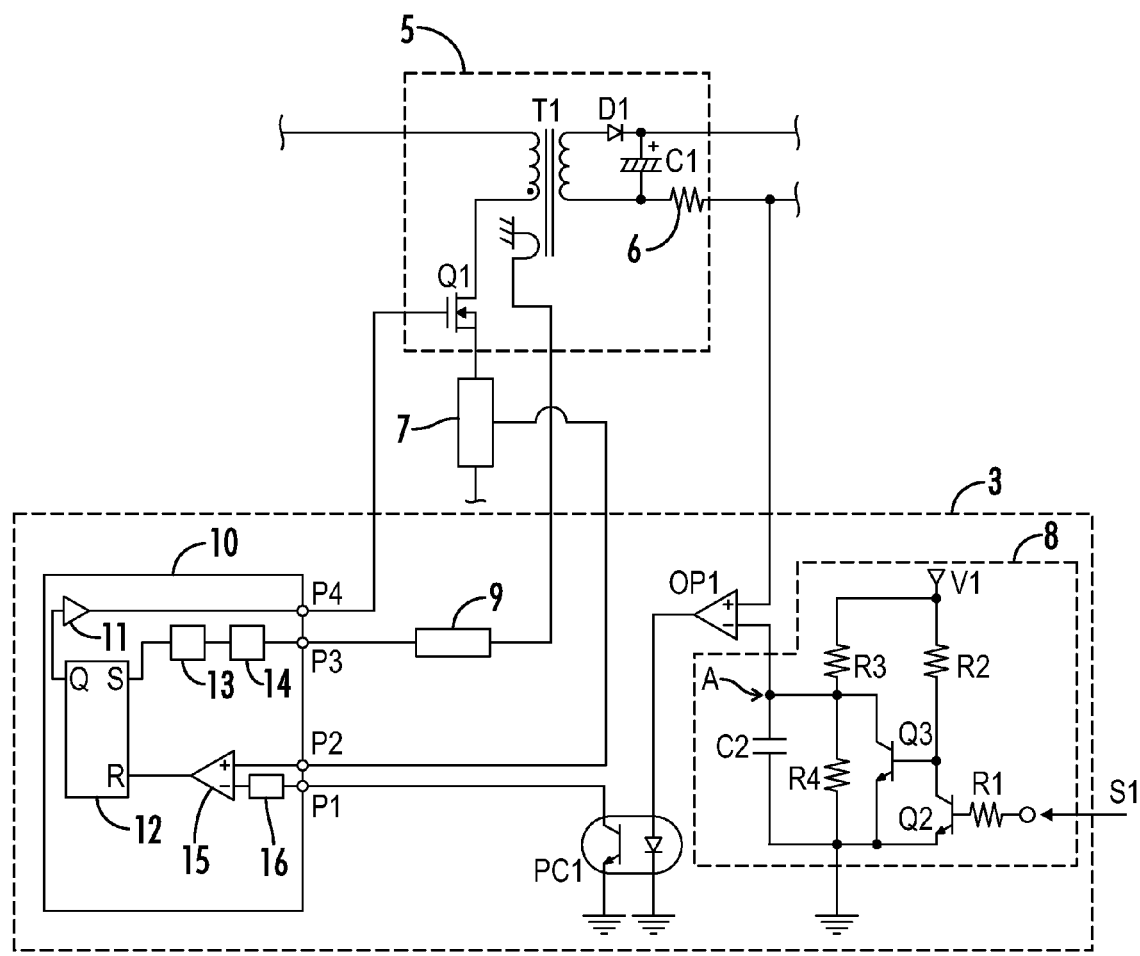
FIG. 2 is a block and partial schematic circuit diagram showing portions of the light fixture of FIG. 1.

Referring to FIG. 2, the dimming control circuit 3 includes a reference signal generator 8, an operational amplifier OP1, and a photo-coupler PC1. The reference signal generator 8 outputs a reference signal based on the received control signal S1. The reference signal from reference signal generator 8 is input to the inverting input of the operational amplifier OP1, and the output from the first current sensor 6 is input to the non-inverting input of the operational amplifier OP1. The output from the operational amplifier OP1 is inputted to a light-emitting element side of the photo coupler PC1.

The reference signal generator 8 includes a transistor Q2, a transistor Q3, a resistor R1, a resistor R2, a resistor R3, a resistor R4, and a capacitor C2. The base terminal of the transistor Q2 receives the control signal S1 via the resistor R1. The base terminal of the transistor Q3 is connected to the collector terminal of the transistor Q2. A DC voltage V1 is applied via a resistor R2 between the collector and emitter of the transistor Q2. A voltage obtained by dividing the DC voltage V1 with resistors R3 and R4 is applied between the collector and emitter of the transistor Q3. The capacitor C2 is connected in parallel to the resistor R4. A voltage across the capacitor C2 is connected to the inverting input terminal of the operational amplifier OP1.

Assuming that the potential of the inverting-input terminal of the operational amplifier OP1 (i.e., potential at a node A of FIG. 2) is a reference potential Va, when the control signal S1 is at an H level (i.e., a digital high level), the transistor Q2 is turned on and the transistor Q3 is turned off. As a result, the reference potential Va gradually increases. When the control signal S1 is at an L level (i.e., a digital low level), the transistor Q2 is turned off and the transistor Q3 is turned on, gradually decreasing the reference potential Va. This is repeated in accordance with a change in a signal level of the control signal S1, and the reference potential Va repeatedly increases and decreases in the same cycle as that of the control signal S1.

Figure 4:
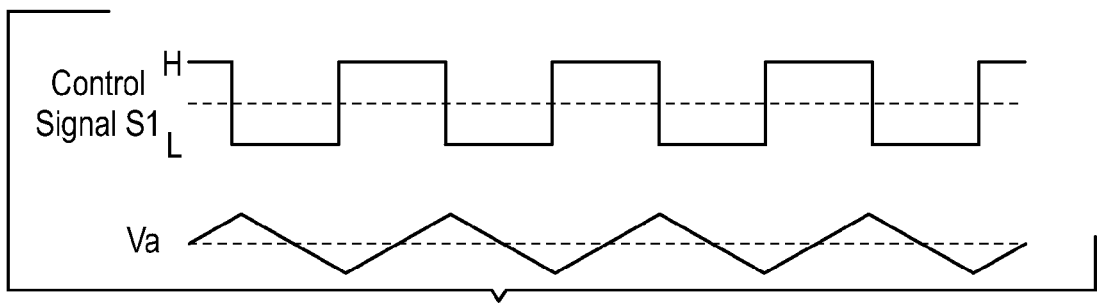
FIG. 4 is a timing diagram illustrating the operation of the light fixture of FIG. 1.

Referring to FIG. 4, the reference signal generator 8 outputs a signal having a frequency component of the same frequency as that of the control signal S1 to the operational amplifier OP1 as a reference signal. The frequency component of the reference signal is also included in the output from the operational amplifier OP1.

Figure 3:
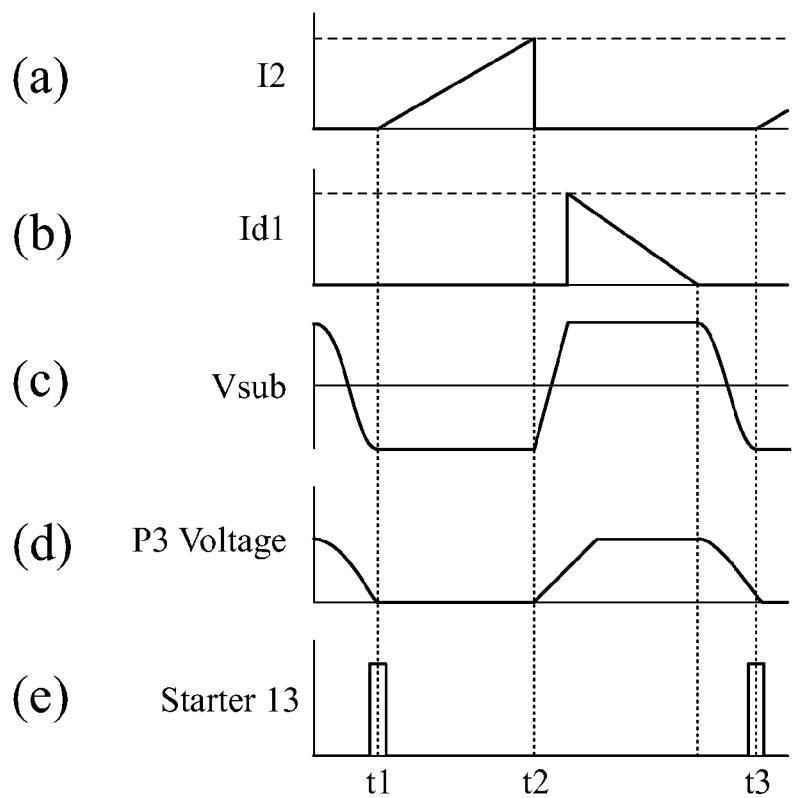
FIG. 3 is a timing diagram illustrating operation of the light fixture of FIG. 1.

In one embodiment, the control circuit 3 includes a general-purpose integrated circuit or microcontroller and a driver IC 10. The driver IC 10 controls the ON/OFF cycling of the switching element Q1. Referring to FIG. 3, the driver IC 10 includes a driver 11, a starter 13, a zero-voltage sensor 14, a comparator 15, a level shifter 16, and a driver controller 12. The driver controller 12 may be an RS flip-flop. The driver IC 10 has at least four terminals including an FB terminal P1, an IS terminal P2, a ZCD terminal P3, and an OUT terminal P4.

The FB terminal P1 is connected to an output side of the photo-coupler PC 1. The voltage at the FB terminal P1 decreases with an increase in input to the photo-coupler PC1. A reference voltage input of the comparator 15 is connected to the FB terminal P1 via the level shifter 16 such that the reference voltage of the comparator 15 decreases with a decrease in the potential of the FB terminal P1. Therefore, the reference voltage of the comparator 15 decreases with an increase in the input to the photo coupler PC1.

The second current sensor 7 is connected to the IS terminal P2. The second current sensor 7 outputs a voltage corresponding to the drain current I2 of the switching element Q1 to the comparator 15. The output from the comparator 15 is input to a reset terminal of the driver controller 12. When the voltage corresponding to the drain current I2 of the switching element Q1 becomes larger than the reference voltage of the comparator 15, the comparator 15 inputs a reset signal to the driver controller 12.

A voltage signal obtained by delaying with a CR circuit 9 is provided to the ZCD terminal P3. For example, a voltage Vsub of a detection winding provided in the transformer T1 is inputted to the ZCD terminal P3. When the voltage input to the ZCD terminal P3 becomes smaller than a threshold value of the zero-voltage sensor 4, a short-pulse waveform is output from the starter 13 to a set terminal of the driver controller 12 as a set signal.

The gate electrode of the switching element Q1 is connected to the OUT terminal P4. The switching element Q1 is switched between ON and OFF in accordance with a driving signal from the driver 11. The driving signal is provided to the switching element Q1 via the OUT terminal P4.

Operation of the circuits shown in FIG. 2 may now be described. When the voltage inputted to the ZCD terminal P3 of the driver IC 10 becomes smaller than the threshold value of the zero-voltage sensor 14 (e.g., at time t1 of FIG. 3), the starter 13 outputs the short-pulse to the set terminal of the driver controller 12. As a result, the driver controller 12 operates the driver 11 and turns on the switching element Q1 of the isolating flyback circuit 5.

When the switching element Q1 of the isolating flyback circuit 5 has been turned on, a core (not shown) of the transformer T1 is magnetized, and a current flowing in the primary winding of the transformer T1 increases gradually. As a result, the drain current I2 of the switching element Q1 increases gradually (see FIG. 3(a))

When the drain current I2 of the switching element Q1 has increased such that the output from the current sensor 7 to the IS terminal P2 becomes larger than a predetermined threshold value, the comparator 15 inputs a reset signal to the driver controller 12. As a result, the driver controller 12 stops the driver 11 to turn off the transistor Q2 (e.g., at time t2 of FIG. 3).

When the switching element Q1 is turned off at time t2, based on energy accumulated in the transformer T1 by the operation described above, a current Id1 flows in the secondary winding of the transformer T1 (see FIG. 3(b)). The current Id1 in the secondary winding decreases gradually with time, as shown in FIG. 3(b).

When the voltage Vsub of the detection winding has decreased after release of the energy stored in the transformer T1 and the current flowing in the primary winding of the transformer T1 has returned to approximately zero, the starter inputs the short-pulse to the set terminal of the driver controller 12 in accordance with the input to the ZCD terminal P3. That is, the switching element Q1 is turned on again. By repeating the operation described above, PWM control is performed.

As a result of the switching operation of the switching element Q1, a substantially constant DC voltage is generated across the capacitor C1. A voltage smoothed by the capacitor C1 is supplied to the light source 2, lighting the light source 2. Luminance output from the light source 2 is determined by a ratio between an ON time and an OFF time (duty cycle) in the switching operation of the switching element Q1.

At low-load time (i.e., when the set dimming level is low), an increase in current pulled from the FB terminal P1 resulting from an increase in input to the photo-coupler PC1 results in a decrease in a reference voltage of the comparator 15. The control circuit 3 stops the switching operation of the switching element Q1 when this reference voltage becomes lower than a predetermined stop threshold voltage Vth. The control circuit 3 restarts the switching operation of the switching element Q1 when the reference voltage becomes higher than the predetermined stop threshold voltage Vth.

The input to the photo-coupler PC1 is the output from the operational amplifier OP1. The output from the operational amplifier OP1 is a difference between the reference signal from the reference signal generator 8 having the frequency component of the same frequency as that of the control signal S1 and the current I1 flowing through the light source 2. Therefore, a voltage input to the photo-coupler PC1 increases with a decrease in the set dimming level and decreases with an increase in the dimming level. The voltage input to the photo-coupler PC1 also varies with the same frequency as that of the reference signal (the same frequency as that of the control signal S1) within a predetermined range.

Figure 5:
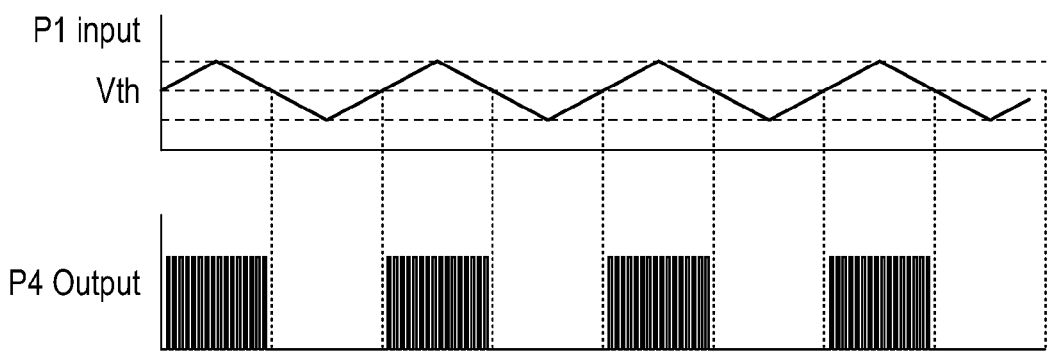
FIG. 5 is a timing diagram illustrating the operation of the light fixture of FIG. 1.

Therefore, a decrease in the dimming level produces a period during which the reference voltage of the comparator 15 is smaller than the stop threshold voltage Vth, which causes a predetermined stop period (i.e., OFF time) in the switching operation of the switching element Q1 (see FIG. 5). For example, while the stop threshold voltage Vth is 0.4V at a lower dimming limit, the voltage of the FB terminal P1 regularly fluctuates in a fluctuation range between a maximum value of 0.5V and a minimum value of 0.3V. When the voltage at the FB terminal P1 is greater than 0.4V, the switching operation is performed, and when the voltage at the FB terminal P1 falls below 0.4V, the switching operation is stopped.

By performing so-called burst control on the switching element Q1 at the low-load time when the dimming level is set low, the control circuit 3 controls the switching element Q1 such that the luminance output from the light source 2 corresponds to the dimming level set by the user. The frequency of the burst control performed by the control circuit 3 is, as described above, set at a frequency of the reference signal output by the reference signal generator 8.

As described above, even when operating the light source 2 at low luminance output, the frequency of the burst control performed by the control circuit 3 can be fixed at a predetermined frequency. This makes it possible to suppress blinking and flickering phenomena.

Moreover, the frequency of a reference signal output based on the control signal S1 and the output of the operational amplifier OP1 are set at the same frequency as that of the control signal S1. Therefore, setting the frequency of the control signal S1 at 1 kHz can also fix the frequency of the burst control at 1 kHz. As a result, a change in the optical output is also fixed at 1 kHz, making it possible to suppress the blinking and the flickering phenomena.

In this case, a lower limit value of the frequency of the control signal S1 is preferably 300 Hz and an upper limit value thereof is preferably 1000 Hz. This can suppress the blinking and the flickering phenomena in a range recognizable by human eyes.

Figure 6:
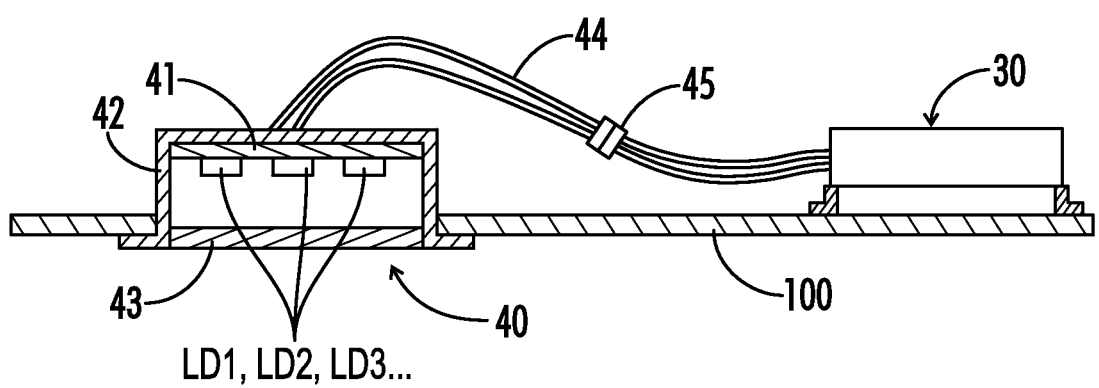
FIG. 6 is a cutaway side view of a housing including a light source and lighting driver circuit.

FIG. 6 shows a cutaway side view of a power source-separated type LED light fixture using the lighting driver circuit according to the present invention. The power source-separated type LED light fixture includes a driver circuit 30 as a power source unit in a case other than a housing 42 of an LED module 40. This can make the LED module 40 (i.e., light source) thinner and the driver circuit 30 as the separated-type power source unit can be installed anywhere. The driver circuit 30 may be attached to the housing 42 or separate from the housing. In any case, the driver circuit 30 is connected to the housing 42 and its components (e.g., electrically or structurally connected).

The fixture housing 42 is formed of a metallic cylindrical body having an open lower end. The open lower end is covered with a light diffusing plate 43. The LED module 40 is arranged opposed to the light diffusing plate 43. An LED mounting board 41 mounts LEDs LD1, LD2, LD3, etc. of the LED module 40 thereon. The fixture housing 42 is embedded in, for example, a ceiling 100 and is wired to the driver circuit 30 as the power source unit arranged in the ceiling cavity via a lead 44 and a connector 45.

In the present embodiment, the power source-separated type LED light fixture is exemplified, in which the driver circuit 30 as the power source unit is stored in a housing separate from the housing 42 of the LED module 40. However, the driver circuit 30 according to the present invention may be applied to a power source-integrated type LED light fixture in which the power source unit and the LED module 40 are stored in, attached to, or supported by the same housing 42.

The driver circuit according to the present invention is not limited to a light fixture and may be used as, for example, a backlight of a liquid crystal display or a light source for a copier, a scanner, a projector, and the like.

Although a light emitting diode is used as the light source in the above-mentioned embodiment, the light source is not limited to this, and may be, for example, an organic EL element and a semiconductor laser element. Although a MOSFET is exemplified as the switching element Q1, other switching elements such as an IGBT may be used.

Thus, although there have been described particular embodiments of the present invention of a new and useful lighting driver circuit and light fixture, it is not intended that such references be construed as limitations upon the scope of this invention except as set forth in the following claims.

What is claimed is:

1. A lighting driver circuit operable to provide power to a light source from a power source, said lighting driver circuit comprising:
   an isolating flyback circuit coupled between the power source and the light source, the isolating flyback circuit comprising
      a transformer having a primary winding and a secondary winding;
      a switching element connected to the primary winding of the transformer and operable to draw current through the primary winding of the transformer from the power source when turned ON as a function of a pulse width modulation signal;
      a diode connected to the secondary winding of the transformer and effective to provide power from the secondary winding of the transformer to the light source; and
      a capacitor connected to the diode effective to smooth the output of the diode; and
   a control circuit operable to provide the pulse width modulation signal to the switching element as a function of a control signal and a feedback signal, said control circuit comprising
      a reference signal generator operable to receive the control signal and provide a reference potential corresponding to a frequency of the control signal;
      an operational amplifier operable to receive the feedback signal and the reference potential and provide a reference voltage representative of a difference between the received feedback signal and the reference potential;
      a driver circuit operable to receive the reference voltage and provide the pulse width modulation signal as a function of the received reference voltage and a stop threshold voltage, wherein the driver circuit turns the switching element OFF as a function of a comparison of the reference voltage to the stop threshold voltage.

2. The lighting driver circuit of claim 1, wherein the driver circuit is a driver integrated circuit comprising a level shifter, a comparator, a driver controller, a driver, a starter, and a zero voltage sensor.

3. The lighting driver circuit of claim 1, wherein the control circuit further comprises a photo-coupler effective to provide the reference voltage from the operational amplifier to the driver circuit and to isolate the reference signal generator and the operational amplifier from the driver circuit.

4. The lighting driver circuit of claim 1, wherein:
   the transformer further comprises a detection winding effective to provide a voltage signal;
   the control circuit further comprises a capacitive resistive circuit operable to delay a voltage signal from the detection winding;
   the control circuit further comprises a driver integrated circuit comprising a zero voltage detector and a starter, wherein
      the zero voltage detector is operable to receive the delayed voltage signal from the capacitive resistive circuit and provide a zero voltage signal to the starter as a function of the delayed voltage signal, and
      the starter is operable to provide a pulse to the driver controller as a function of the zero voltage signal.

5. The lighting driver circuit of claim 1, wherein the light source comprises a solid state light-emitting element, and the solid state light emitting element is one of a light emitting diode or an organic electroluminescence device.

6. The lighting driver circuit of claim 1, wherein the feedback signal is indicative of a current through the solid state light-emitting device.

7. The lighting driver circuit of claim 1, wherein the driver circuit maintains the switching element OFF while the comparison of the reference voltage to the stop threshold voltage indicates that the reference voltage is less than the stop threshold voltage.

8. A light fixture comprising:
   a housing;
   a solid state light emitting element supported by the housing and operable to provide light in response to receiving power; and
   a lighting driver circuit connected to the housing and operable to provide power to the light source from a power source, said lighting driver circuit comprising:
      an isolating flyback circuit operable to connect between the power source and the light source, said isolating flyback circuit comprising:
         a transformer having a primary winding and a secondary winding;
         a switching element connected to the primary winding of the transformer and operable to draw current through the primary winding of the transformer from the power source when turned ON as a function of a pulse width modulation signal;
         a diode connected to the secondary winding of the transformer and operable to provide power from the secondary winding of the transformer to the light source; and
         a capacitor connected to the diode operable to smooth the output of the diode; and
      a control circuit operable to provide the pulse width modulation signal to the switching element as a function of a control signal and a feedback signal, said control circuit comprising:
         a reference signal generator operable to receive the control signal and provide a reference potential corresponding to a frequency of the control signal;
         an operational amplifier operable to receive the feedback signal and the reference potential and provide a reference voltage representative of a difference between the received feedback signal and the reference potential;
         a driver circuit operable to receive the reference voltage and provide the pulse width modulation signal as a function of the received reference voltage and a stop threshold voltage, wherein the driver circuit turns the switching element OFF as a function of a comparison of the reference voltage to the stop threshold voltage.

9. The light fixture of claim 8, wherein the driver circuit is a driver integrated circuit comprising a level shifter, a comparator, a driver controller, a driver, a starter, and a zero voltage sensor.

10. The light fixture of claim 8, wherein the control circuit further comprises a photo coupler operable to provide the reference voltage from the operational amplifier to the driver circuit and to isolate the reference signal generator and the operational amplifier from the driver circuit.

11. The light fixture of claim 8, wherein:
   the transformer further comprises a detection winding operable to provide a voltage signal;
   the control circuit further comprises a capacitive resistive circuit operable to delay a voltage signal from the detection winding;

the control circuit further comprises a driver integrated circuit comprising a zero voltage detector and a starter, wherein the zero voltage detector is operable to receive the delayed voltage signal from the capacitive resistive circuit and provide a zero voltage signal to the starter as a function of the delayed voltage signal, and the starter is operable to provide a pulse to the driver controller as a function of the zero voltage signal.

12. The light fixture of claim 8, wherein the light source comprises a solid state light-emitting element and the solid state light-emitting element is one of a light emitting diode or an organic electroluminescence device.

13. The light fixture of claim 8, wherein the feedback signal is indicative of a current through the solid state light-emitting device.

14. The light fixture of claim 8, wherein the driver circuit maintains the switching element OFF while the comparison of the reference voltage to the stop threshold voltage indicates that the reference voltage is less than the stop threshold voltage.

15. The light fixture of claim 8, wherein the control signal is indicative of a dimming level.

16. A lighting driver circuit operable to drive a light source, said lighting driver circuit comprising:

an isolating flyback circuit comprising a switching element, a diode, and a capacitor, wherein the isolating flyback circuit is operable to switch an input from a DC power source via the switching element of the isolating flyback circuit, output the switched input to the light source via the diode of the isolating flyback circuit, and smooth the outputted switched input via the capacitor of the isolating flyback circuit, and a control circuit operable to control a switching operation of the switching element to adjust the output to the light source based on a control signal having a duty cycle representative of a dimming control level, wherein the control circuit comprises:

a driver controller operable to perform pulse width modulation (PWM) control on the switching element; and a burst control circuit operable to receive a feedback signal representative of the output to the light source and provide a quiescent period in the PWM control performed by the driver controller as a function of a stop threshold voltage and a reference signal, wherein the reference signal is provided as a function of the control signal and a magnitude of the feedback signal, and the reference signal has a predetermined frequency.

17. The lighting driver circuit of claim 16, wherein the burst control circuit is effective to provide the reference signal with a reference potential as a function of a frequency of the control signal.

18. The lighting driver circuit of claim 16, wherein a lower limit value of the frequency of the control signal is 300 Hz and an upper limit value of the frequency of the control signal is 1000 Hz.

19. A light fixture comprising:

a housing;

the lighting driver circuit of claim 16, wherein the lighting driver circuit is connected to the housing; and the light source, wherein the light source is supported by the housing.

20. The lighting driver circuit of claim 16, wherein the light source comprises a solid state light-emitting element and the solid state light-emitting element is one of a light emitting diode or an organic electroluminescence device.

* * * * *